(12) United States Patent
Ukita et al.

(10) Patent No.: US 10,953,843 B2
(45) Date of Patent: Mar. 23, 2021

(54) GAS GENERATOR

(71) Applicant: DAICEL CORPORATION, Osaka (JP)

(72) Inventors: Shinichiro Ukita, Tatsuno (JP); Tomoharu Kobayashi, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 189 days.

(21) Appl. No.: 16/307,194

(22) PCT Filed: May 16, 2017

(86) PCT No.: PCT/JP2017/018279
§ 371 (c)(1),
(2) Date: Dec. 5, 2018

(87) PCT Pub. No.: WO2018/003327
PCT Pub. Date: Jan. 4, 2018

(65) Prior Publication Data
US 2019/0126886 A1    May 2, 2019

(30) Foreign Application Priority Data

Jun. 27, 2016 (JP) ............... JP2016-126595

(51) Int. Cl.
*B60R 21/272* (2006.01)
*B60R 21/268* (2011.01)
(Continued)

(52) U.S. Cl.
CPC ............ *B60R 21/272* (2013.01); *B60R 21/26* (2013.01); *B60R 21/261* (2013.01);
(Continued)

(58) Field of Classification Search
CPC ... B60R 21/264; B60R 21/2644; B60R 21/27; B60R 21/274
See application file for complete search history.

(56) References Cited

U.S. PATENT DOCUMENTS 4,068,862 A * 1/1978 Ishi .................. B60R 21/26
102/531
5,584,504 A * 12/1996 Cuevas ............. B60R 21/26
102/531
(Continued)

FOREIGN PATENT DOCUMENTS

EP        0768218 A1 *  4/1997 ........... B60R 21/272
JP        2004-58984 A   2/2004
(Continued)

*Primary Examiner* — Nicole T Verley
(74) *Attorney, Agent, or Firm* — Birch, Stewart, Kolasch & Birch, LLP

(57) ABSTRACT

A gas generator includes, an ignition device chamber arranged on a first end of a housing, a diffuser including a gas discharge port and closing a second end of the housing, a gas containing chamber disposed between the diffuser and the ignition device chamber, a first rupturable plate closing the ignition device chamber from the gas containing chamber, and a second rupturable plate closing the gas containing chamber from the diffuser, and a cup-shaped deflector disposed on a side of the second rupturable plate. The cup-shaped deflector includes a gas passage in a peripheral surface and a fragile section on at least one of a bottom surface and the peripheral surface, and is disposed with the bottom surface located on a side of the first rupturable plate, with an opening covering the second rupturable plate, and defines a gap between the peripheral surface and an inner surface of the housing.

20 Claims, 4 Drawing Sheets

(51) Int. Cl.
 *B60R 21/26* (2011.01)
 *B60R 21/261* (2011.01)
 *B60R 21/274* (2011.01)

(52) U.S. Cl.
 CPC .......... *B60R 21/268* (2013.01); *B60R 21/274* (2013.01); *B60R 2021/2612* (2013.01); *B60R 2021/26029* (2013.01)

(56) References Cited

U.S. PATENT DOCUMENTS

| | | | | |
|---|---|---|---|---|
| 5,803,492 | A * | 9/1998 | Rink | B60R 21/272 222/3 |
| 5,941,563 | A * | 8/1999 | Schoenborn | B60R 21/261 280/736 |
| 7,134,689 | B2 * | 11/2006 | Matsuda | B60R 21/261 280/736 |
| 7,398,996 | B2 * | 7/2008 | Saito | B60R 21/2644 280/741 |
| 7,419,183 | B2 * | 9/2008 | Tokuda | B60R 21/272 280/737 |
| 7,431,337 | B2 * | 10/2008 | Matsuda | F42B 3/045 102/202 |
| 7,658,406 | B2 * | 2/2010 | Townsend | B60R 21/264 280/737 |
| 7,665,763 | B2 * | 2/2010 | Bjorklund | B60R 21/268 280/737 |
| 7,802,813 | B2 * | 9/2010 | Yamashita | B21D 39/06 280/741 |
| 8,052,169 | B2 * | 11/2011 | Yano | B60R 21/272 280/737 |
| 8,236,112 | B2 * | 8/2012 | Yamazaki | B60R 21/2644 149/2 |
| 8,667,897 | B2 * | 3/2014 | Nakayasu | B60R 21/272 102/530 |
| 9,481,339 | B2 * | 11/2016 | Kobayashi | B60R 21/274 |
| 9,731,680 | B2 * | 8/2017 | Kobayashi | B60R 21/272 |
| 9,827,943 | B2 * | 11/2017 | Kobayashi | B60R 21/274 |
| 10,046,727 | B2 * | 8/2018 | Hanano | B60R 21/261 |
| 10,759,377 | B2 * | 9/2020 | Ohsugi | B60R 21/264 |
| 2004/0066024 | A1 | 4/2004 | Shioji et al. | |
| 2005/0029788 | A1 * | 2/2005 | Katsuda | B60R 21/2644 280/741 |
| 2005/0189753 | A1 * | 9/2005 | Kato | F42B 3/04 280/741 |
| 2006/0249938 | A1 * | 11/2006 | Matsuda | B60R 21/261 280/736 |
| 2007/0085314 | A1 * | 4/2007 | Matsuda | B60R 21/2644 280/740 |
| 2010/0001497 | A1 * | 1/2010 | Yamazaki | C06D 5/06 280/736 |
| 2011/0018243 | A1 | 1/2011 | Yano et al. | |
| 2011/0148084 | A1 | 6/2011 | Kratz et al. | |
| 2012/0079958 | A1 * | 4/2012 | Nakayasu | B60R 21/272 102/530 |
| 2014/0230685 | A1 | 8/2014 | Hanano et al. | |
| 2014/0239623 | A1 * | 8/2014 | Tokuda | B60R 21/272 280/737 |
| 2016/0068133 | A1 | 3/2016 | Kobayashi et al. | |
| 2017/0050609 | A1 * | 2/2017 | Yamashita | B60R 21/2644 |
| 2017/0349136 | A1 | 12/2017 | Hanano et al. | |
| 2018/0043854 | A1 * | 2/2018 | Kobayashi | B60R 21/261 |
| 2020/0061566 | A1 * | 2/2020 | Yamamoto | B01J 7/00 |

FOREIGN PATENT DOCUMENTS

| | | |
|---|---|---|
| JP | 2011-523919 A | 8/2011 |
| JP | 2012-505102 A | 3/2012 |
| JP | 2014-210557 A | 11/2014 |
| JP | 2016-107689 A | 6/2016 |
| WO | WO 2014/126011 A1 | 8/2014 |
| WO | WO-2018147020 A1 * | 8/2018 ........... B60R 21/272 |
| WO | WO-2018193672 A1 * | 10/2018 ........... B60R 21/264 |

* cited by examiner

GAS GENERATOR

TECHNICAL FIELD

The present invention relates to a gas generator that can be used in an air bag device of a vehicle.

BACKGROUND ART

To prevent a fragment of a broken internal component from being discharged from a gas discharge port when a gas generator is activated, means (a filter) for catching the fragment is used.

JP 2004-58984 A discloses the invention of an inflator using compressed gas as a gas source. In an inflator 110 illustrated in FIG. 7 of this patent document, a diffuser 116 including a gas discharge port 141 is formed at one end of an inflator housing 112, and an inner space 114 containing compressed gas is defined inside the housing 112. A compressed gas passage 144 in the diffuser 116 and the inner space 114 are closed off from one another by a first rupturable plate 122. A filter 120 disposed in the compressed gas passage 144 includes a large number of circular through-holes 147 formed in a peripheral surface section 145, an opening end 143 covering the gas discharge port 141, and a closed portion 142 facing the first rupturable plate 122. The patent document discloses that a pocket 140 is formed between the radially outer side of the filter 120 and the compressed gas passage 144, and that a fragment of the first rupturable plate 122, a fragment of a second rupturable plate 130, or a combustion residue of a gas generating agent 125 can be accumulated in the pocket 140.

DISCLOSURE OF INVENTION

According to a first aspect of the present invention (hereinafter referred to as "first aspect"), a gas generator includes: an ignition device chamber arranged on a first end side of a cylindrical housing and closed by an ignition device provided with an igniter; a diffuser including a gas discharge port and closing a second end side of the cylindrical housing opposite to the first end in an axial direction; a compressed gas containing chamber disposed between the diffuser and the ignition device chamber and containing therein a compressed gas as a gas source; a first rupturable plate disposed closing off the ignition device chamber and the compressed gas containing chamber from one another, and a second rupturable plate disposed closing off the compressed gas containing chamber and the diffuser from one another; and a cup-shaped deflector disposed on a side of the second rupturable plate where the compressed gas containing chamber is disposed. The cup-shaped deflector includes a gas passage in a peripheral surface section thereof, and a fragile section on at least one of a bottom surface section thereof and the peripheral surface section. The cup-shaped deflector is disposed with the bottom surface section located on a side where the first rupturable plate is disposed, with an opening covering the second rupturable plate, and with a cylindrical gap defined between the peripheral surface section and an inner peripheral wall surface of the cylindrical housing.

According to a second aspect of the present invention (hereinafter referred to as "second aspect"), a gas generator includes: an ignition device chamber arranged on a first end side of a cylindrical housing and closed by an ignition device provided with an igniter; a diffuser including a gas discharge port and closing a second end side of the cylindrical housing opposite to the first end in an axial direction; a combustion chamber disposed between the diffuser and the ignition device chamber and containing therein a gas generating agent as a gas source; a sealing member disposed closing off the combustion chamber and the diffuser from one another; and a cup-shaped deflector disposed on a side of the interrupting member where the combustion chamber is disposed. The cup-shaped deflector includes a gas passage in a peripheral surface section thereof, and a fragile section on at least one of a bottom surface section thereof and the peripheral surface section. The cup-shaped deflector is disposed with the bottom surface section located on the first end side, with an opening covering the sealing member, and with a cylindrical gap defined between the peripheral surface section and an inner peripheral wall surface of the cylindrical housing.

BRIEF DESCRIPTION OF DRAWINGS

The present invention will be fully understood from the following detailed description and the attached drawings; however, the description and the drawings are merely to describe the invention and should not be construed to limit the invention.

FIG. 5A illustrates a state before activation of the gas generator in FIG. 1 and FIG. 5B illustrates a state after activation.

FIG. 6A illustrates a state before activation of the gas generator in FIG. 1 and FIG. 6B illustrates a state after activation.

FIG. 7A illustrates a state before activation of the gas generator in FIG. 1 and FIG. 7B illustrates a state after activation.

FIG. 8A illustrates a state before activation of the gas generator in FIG. 1 and FIG. 8B illustrates a state after activation.

DETAILED DESCRIPTION OF INVENTION

Figure 1:
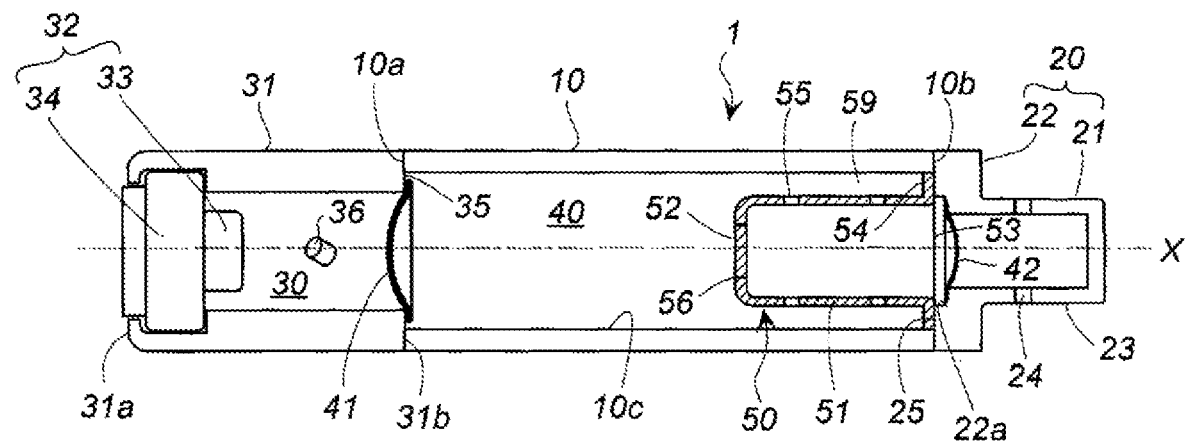
FIG. 1 is a cross-sectional view of a gas generator of the present invention in the direction of a long axis X.

The present invention provides a gas generator that, even if a fragment of a broken internal component partially blocks a gas discharge path during operation, can secure the gas discharge path and can maintain a required gas discharge speed.

A cylindrical housing is made of metal, such as iron and stainless steel.

An ignition device including an igniter includes any of only the igniter, a combination of the igniter and a transfer charge, and a combination of the igniter and a gas generating agent. The igniter includes an igniter main body that includes an ignition section and a conductive pin and that is integrated with a metal collar via a resin. The ignition section includes an ignition charge contained in a metal cup. The transfer charge or the gas generating agent, if used in the ignition device, may be contained in a different cup member disposed adjacent to the metal cup containing the ignition charge.

A compressed gas containing chamber uses known compressed gas, such as argon and helium, as a gas source, and is closed by a first rupturable plate and a second rupturable plate to seal the inside. The first rupturable plate and the second rupturable plate are preferably made of the same material as that of the cylindrical housing.

A cup-shaped deflector is made of metal, such as iron and stainless steel, and includes a gas passage in a peripheral surface section and a fragile section on at least one of a bottom surface section and the peripheral surface section. The fragile section is less strong than the vicinity of the fragile section, and preferentially ruptures or deforms during operation. The fragile section is constituted by a groove, a thin wall, or the like. The cup-shaped deflector may include a flange around its opening, and may have a rounded boundary between the bottom surface section and the peripheral surface section.

When the igniter is activated, the first rupturable plate ruptures to make an ignition device chamber and the compressed gas containing chamber continuous and to allow high-temperature combustion gas to flow into the compressed gas containing chamber. The combustion gas and the compressed gas enter the cup-shaped deflector through the gas passage of the deflector, then move to a diffuser, and are discharged from a gas discharge port. If a fragment generated by the rupture of the first rupturable plate in this process partially blocks the gas passage of the cup-shaped deflector, the total cross-sectional area of the gas discharge path decreases, so that a required gas discharge speed cannot be ensured, resulting in a decrease in air bag inflation speed.

Note that a fragment of the cup member, if included in the ignition device, may also partially block the gas passage, and a fragment of a metal cup covering the ignition section of the igniter may also act similarly.

In the gas generator according to the first aspect, the cup-shaped deflector includes the fragile section. If a fragment or the like of the first rupturable plate is generated during operation, the fragment collides with the fragile section, and the fragile section ruptures to form a new gas discharge path. In addition, if the fragment is stuck in a cylindrical gap outside the cup-shaped deflector and partially blocks the gas passage, impact due to the collision of the fragment or an increase in pressure in the housing due to the blocking with the fragment deforms the cup-shaped deflector in such a manner that the cup-shaped deflector is compressed in the axial direction. This deforms the fragile section and expands the gas passage. Thus, even if the gas passage is partially blocked as described above, the required total cross-sectional area of the gas discharge path can be ensured, and the gas discharge speed (i.e., air bag inflation speed) is not affected. Furthermore, the blocked gas passage prevents overpressure in the housing. That is, the gas generator of the present invention has a structure in which application of a load deforms or ruptures the fragile section to expand the cross-sectional area of the gas discharge path. Accordingly the gas discharge path greater than the total opening area of the gas passage before activation of the gas generator is secured. Note that the fragile section does not deform or rupture by normal operation (in the design).

The gas generator according to the second aspect includes a different gas source from that of the gas generator of the first aspect, and thus partially has a different structure.

The ignition device and the combustion chamber may be continuous or separated from each other with a mesh member or the like if necessary. The ignition device may include a known transfer charge or gas generating agent. A sealing member is used for closing off the combustion chamber and the diffuser from one another for prevention of moisture.

When the igniter is activated, combustion products including flame and high-temperature gas are generated. The combustion products ignite and combust the gas generating agent, thus generating combustion gas. The combustion gas enters the cup-shaped deflector through the gas passage of the deflector, then moves to the diffuser, and is discharged from the gas discharge port. In this process, if a fragment of the metal cup covering the ignition section of the igniter, a fragment of the cup member, if included in the ignition device, or the like is generated and partially blocks the gas passage of the cup-shaped deflector, the total cross-sectional area of the gas discharge path decreases, so that a required gas discharge speed cannot be ensured, resulting in a decrease in the air bag inflation speed.

In the gas generator according to the second aspect, the cup-shaped deflector includes the fragile section. If the fragment or the like is generated during operation, the fragment collides with the fragile section, and the fragile section ruptures to form a new gas discharge path. In addition, if the fragment is stuck in a cylindrical gap outside the cup-shaped deflector and partially blocks the gas passage, impact due to the collision of the fragment or an increase in pressure in the housing due to the blocking with the fragment deforms the cup-shaped deflector in such a manner that the cup-shaped deflector is compressed in the axial direction. This deforms the fragile section and expands the gas passage. Thus, even if the gas passage is partially blocked as described above, the required total cross-sectional area of the gas discharge path can be ensured, and the gas discharge speed (i.e., air bag inflation speed) is not affected. Furthermore, overpressure in the housing due to the blocked gas passage can be prevented. That is, the gas generator of the present invention has a structure in which application of a load deforms or ruptures the fragile section to expand the cross-sectional area of the gas discharge path. Accordingly the gas discharge path greater than the total opening area of the gas passage before activation of the gas generator is secured. Thus, the fragile section does not deform or rupture by normal operation (in the design).

In each of the gas generators according to the first aspect and the second aspect, the cup-shaped deflector preferably includes the gas passage in the peripheral surface section and the fragile section on the bottom surface section.

The fragile section is preferably constituted by a groove formed along a line connecting a starting point and an ending point located remote from each other so as not to have a shortest distance (L), the groove having a total distance of from 2 L to 15 L (third aspect).

The gas passage formed in the peripheral surface section may be constituted by a plurality of rows of small circular or oval holes formed at regular intervals in the circumferential direction, the rows being arranged in the longitudinal direction (for example, the arrangement of the circular through-holes 147 illustrated in FIG. 7 of JP 2004-58984 A). Such arrangement of the gas passage can increase the strength of the peripheral surface section in which the gas passage is formed, in comparison with that of the fragile section.

The fragile section is formed only on the bottom surface section of the cup-shaped deflector. The groove constituting the fragile section has a cross section having a V shape, a U shape, or a shape similar to these in the width direction. The fragile section is not formed between the starting point and the ending point. The line connecting the starting point and the ending point and constituting the fragile section is a curved line, a straight line, or a combination of a curved line and a straight line. In this case, the fragile section is preferentially severed upon application of a load. To allow the shortest distance L portion (connecting portion) connecting the starting point and the ending point to be readily bent after the fragile section is severed, the connecting portion may be formed by a groove shallower than the fragile section or a perforated groove.

The distance of the groove constituting the fragile section can be selected from the range of 2 L to 15 L in consideration of the relationship with the total opening area of the gas passage. Here, a distance of 2 L provides the smallest opening area of the ruptured fragile section, and a distance of 15 L provides the largest opening area of the ruptured fragile section. The fragile section can be selected from a fragile section constituted by a groove formed into an arc, a fragile section constituted by a grooved formed along two sides of a triangle, a fragile section constituted by a groove formed along three sides of a quadrangle, and the like. Note that the fragile section may be constituted by a thin wall surrounded by the above-described line having a total distance of 2 L to 15 L.

In each of the gas generators according to the first aspect and the second aspect, the cup-shaped deflector preferably includes the gas passage and the fragile section in the peripheral surface section; the gas passage is preferably constituted by a plurality of elongated holes formed in a section between the bottom surface section and the opening, the elongated holes being formed at intervals in the circumferential direction; and the fragile section is preferably constituted by a plurality of peripheral walls remaining between the elongated holes in the circumferential direction (fourth aspect).

The elongated holes formed, as the gas passage of the cup-shaped deflector, in the peripheral surface section at intervals in the circumferential direction provide elongated peripheral walls formed between adjacent holes among the elongated holes. (For example, a total of eight elongated holes provide eight elongated peripheral walls.) The elongated holes have a shape having an opening longer in the axial direction of the cylindrical housing than in the circumferential direction, such as a rectangular shape, a rectangular shape having rounded corners between short sides and long sides, an oval shape, a diamond shape, and a diamond shape having rounded corners. Each of these eight elongated peripheral walls between the eight elongated holes serves as the fragile section.

During operation, the compressed gas flows from the first end side of the cylindrical housing to the second end side and thus applies pressure to the cup-shaped deflector in the axial direction. At this time, if a fragment collides, or if a fragment partially blocks the gas passage and pressure in the cylindrical housing is thus increased, each of the elongated peripheral walls is bent so that the cup-shaped deflector expands its diameter outward from around its longitudinal midpoint or so that the elongated peripheral wall collapses inward, and the cup-shaped deflector thus deforms in a compressed manner. This is because the elongated peripheral walls have reduced strength to serve as the fragile section. If the cup-shaped deflector deforms in this way, each of the elongated holes deforms so as to expand its opening. Thus, even if a fragment or the like partially blocks the gas passage as described above, the required total cross-sectional area of the gas discharge path can be ensured, and the gas discharge speed and the air bag inflation speed are not affected.

In each of the gas generators according to the first aspect and the second aspect, the cup-shaped deflector preferably includes the gas passage and the fragile section in the peripheral surface section; the gas passage is preferably constituted by a plurality of rectangular holes formed in a section between the bottom surface section and the opening, the rectangular holes being formed at intervals in the circumferential direction and each having a width $W1$; the fragile section is preferably constituted by a plurality of peripheral walls remaining between the rectangular holes in the circumferential direction, the peripheral walls each having a width $W2$; and the width $W1$ of the rectangular holes and the width $W2$ of the peripheral walls constituting the fragile section preferably satisfy a relationship $W1>W2$ (fifth aspect).

The rectangular holes formed, as the gas passage of the cup-shaped deflector, in the peripheral surface section at intervals in the circumferential direction provide rectangular peripheral walls formed between adjacent holes among the rectangular holes. (For example, a total of eight rectangular holes provide eight rectangular peripheral walls.) Here, the width $W1$ of the rectangular holes and the width $W2$ of the rectangular peripheral walls satisfy the relationship $W1>W2$, so that each of the rectangular peripheral walls between the rectangular holes serves as the fragile section. If $W1$ and $W2$ satisfy a relationship $W1<W2$, the rectangular peripheral walls have greater strength and thus cannot sufficiently serve as the fragile section.

During operation, the compressed gas flows from the first end side of the cylindrical housing to the second end side and thus applies pressure to the cup-shaped deflector in the axial direction. At this time, if a fragment collides, or if a fragment partially blocks the gas passage and pressure in the cylindrical housing is thus increased, each of the rectangular peripheral walls is bent so that the cup-shaped deflector expands its diameter outward from around its longitudinal midpoint or so that the rectangular peripheral wall collapses inward, and the cup-shaped deflector thus deforms in a compressed manner. This is because the rectangular peripheral walls have reduced strength to serve as the fragile section. If the cup-shaped deflector deforms in this way, each of the rectangular holes deforms so as to expand its opening. Thus, even if a fragment or the like partially blocks the gas passage as described above, the required total cross-sectional area of the gas discharge path can be ensured, and the gas discharge speed and the air bag inflation speed are not affected.

In each of the gas generators according to the first aspect and the second aspect, the cup-shaped deflector preferably includes the gas passage and the fragile section in the peripheral surface section; the gas passage is preferably constituted by a plurality of elongated holes formed in a section between the bottom surface section and the opening, the elongated holes being formed at intervals in a circumferential direction and each having a maximum width (short-axis length) W11 at a longitudinally intermediate portion; the fragile section is preferably constituted by a plurality of peripheral walls remaining between the elongated holes in the circumferential direction, the peripheral walls each having a minimum width W12 at the longitudinally intermediate portion of the elongated holes; and a relationship W12/W11≤0.5 is preferably satisfied (sixth aspect).

The specific elongated holes formed, as the gas passage of the cup-shaped deflector, in the peripheral surface section at intervals in the circumferential direction provide specific elongated peripheral walls formed between adjacent holes among the elongated holes. (For example, a total of eight specific elongated hole provide eight specific elongated peripheral wall.) The specific elongated holes each have such a shape that the longitudinally intermediate portion has the maximum width (short-axis length) W11, for example, an oval shape, a diamond shape, or a diamond shape having rounded corners. If a total of eight oval holes are formed at intervals in the circumferential direction, for example, eight peripheral walls having the minimum width (W12) at the longitudinally intermediate portions are formed between the eight oval holes. This configuration allows the eight peripheral walls to be readily bent at the portions having the minimum width W12, and these portions serve as the fragile section.

During operation, the compressed gas flows from the first end side of the cylindrical housing to the second end side and thus applies pressure to the cup-shaped deflector in the axial direction. At this time, if a fragment collides, or if a fragment partially blocks the gas passage and pressure in the cylindrical housing is thus increased, each of the peripheral walls having the minimum width W12 is bent so that the cup-shaped deflector expands its diameter outward from around the portion having the minimum width W12 or so that the peripheral wall collapses inward, and the cup-shaped deflector thus deforms in a compressed manner. This is because the peripheral walls having the minimum width W12 have reduced strength to serve as the fragile section. If the cup-shaped deflector deforms in this way, each of the elongated holes deforms so as to expand its opening. Thus, even if a fragment or the like partially blocks the gas passage as described above, the required total cross-sectional area of the gas discharge path can be ensured, and the air bag inflation speed is not affected.

In each of the gas generators according to the fourth aspect to the sixth aspect, the cup-shaped deflector preferably includes the gas passage and the fragile section in the peripheral surface section; and a ratio (L2/L1) of a length L2 of the gas passage to a length L1 from the opening to the bottom surface section of the cup-shaped deflector is preferably from 0.5 to 0.9 (seventh aspect).

A ratio L2/L1 within the above range is preferable because the peripheral walls constituting the fragile section readily deform during operation.

In each of the gas generators according to the first aspect to the seventh aspect, a ratio D2/D1 of an outer diameter D2 of the cup-shaped deflector to an inner diameter D1 of the cylindrical housing is preferably from 0.5 to 0.8; and the cylindrical gap defined between the peripheral surface section of the cup-shaped deflector and the inner peripheral wall surface of the cylindrical housing has a width defined as (D1−D2)/2.

A ratio D2/D1 within the above range allows the cylindrical gap to have a width within a predetermined range and can thus secure a sufficient gas discharge path. This is preferable especially in the case of the fragile section formed in the peripheral surface section of the cup-shaped deflector because a sufficient gas discharge path can be secured.

Even if a fragment of a broken internal component partially blocks the gas discharge path during operation, the gas generator of the present invention can secure the gas discharge path, and can thus maintain a required gas discharge speed and prevent pressure from rising beyond pressure resistance of the gas generator.

The gas generator of the present invention can be used in an air bag device mounted in a vehicle.

Embodiments of Invention (1) Gas Generator in FIG. 1 to FIGS. 5A and 5B

A gas generator 1 illustrated in FIG. 1 includes an ignition device chamber 30 disposed on a first end 10a side of a cylindrical housing 10 made of stainless steel, a diffuser 20 disposed on a second end 10b side opposite in the axial direction, and a compressed gas containing chamber 40 disposed between the ignition device chamber 30 and the diffuser 20. The gas generator 1 illustrated in FIG. 1 uses both compressed gas and a gas generating agent as a gas source.

The ignition device chamber 30 includes a cylindrical ignition device chamber housing 31 made of stainless steel and accommodates an igniter 32 and a gas generating agent 36. The contact portion between a second end 31b of the ignition device chamber housing 31 and the first end 10a of the cylindrical housing 10 is fixed by welding. The ignition device chamber housing 31 is thicker than the cylindrical housing 10, so that a first annular surface 35 facing the compressed gas containing chamber 40 is formed at the contact portion.

The igniter 32 is formed by integrating an igniter main body (an ignition section 33 and a conductive pin) and an igniter collar 34 via a resin. The igniter 32 is fitted into an opening at a first end 31a of the ignition device chamber housing 31, and is fixed to and locked in the ignition device chamber housing 31 by crimping an end of the opening at the first end 31a.

As the gas generating agent 36, a gas generating agent used in a known gas generator can be used.

The diffuser 20 is made of stainless steel, and includes a cup section 21 and an annular section 22 extending from an opening of the cup section 21 and shaped into a flange. A plurality of gas discharge ports 24 are formed in a peripheral wall 23 of the cup section 21. An annular stepped surface 22a to which a second rupturable plate 42 is fixed is formed at a portion, facing the compressed gas containing chamber 40, of the annular section 22. The diffuser 20 is fixed by welding the contact portion between the annular section 22 and an end surface at the second end 10b of the cylindrical housing 10. The width of the annular section 22 is greater than the thickness of the cylindrical housing 10, so that a second annular surface 25 facing the compressed gas containing chamber 40 is formed at the contact portion.

The compressed gas containing chamber 40 disposed between the diffuser 20 and the ignition device chamber 30 contains compressed gas, such as argon and helium, being the gas source. The gas is charged into the compressed gas containing chamber 40 through a gas charging hole (not illustrated) formed in the cylindrical housing 10. After the charge, the gas charging hole is welded to the cylindrical housing 10 together with a closing pin (not illustrated).

The ignition device chamber 30 and the compressed gas containing chamber 40 are closed off to one another by a first rupturable plate 41 made of stainless steel, and the compressed gas containing chamber 40 and the diffuser 20 are closed off to one another by the second rupturable plate 42 made of stainless steel. The first rupturable plate 41 is fixed by welding its peripheral edge while in contact with the first annular surface 35, and the second rupturable plate 42 is fixed by welding its peripheral edge while in contact with the annular stepped surface 22a.

A cup-shaped deflector 50 is disposed on the compressed gas containing chamber 40 side of the second rupturable plate 42. The cup-shaped deflector 50 also contains compressed gas. The cup-shaped deflector 50 includes a peripheral surface section 51, a bottom surface section 52, and a flange 54 formed around an opening 53. Note that in FIG. 4, the boundary between the peripheral surface section 51 and the bottom surface section 52 of the cup-shaped deflector 50 is not rounded; however, the boundary may be rounded.

The cup-shaped deflector 50 is disposed with its central axis coinciding with the central axis X of the cylindrical housing 10, the bottom surface section 52 located on the side where the first rupturable plate 41 is disposed, and the opening 53 covering the second rupturable plate 42.

Figure 4:
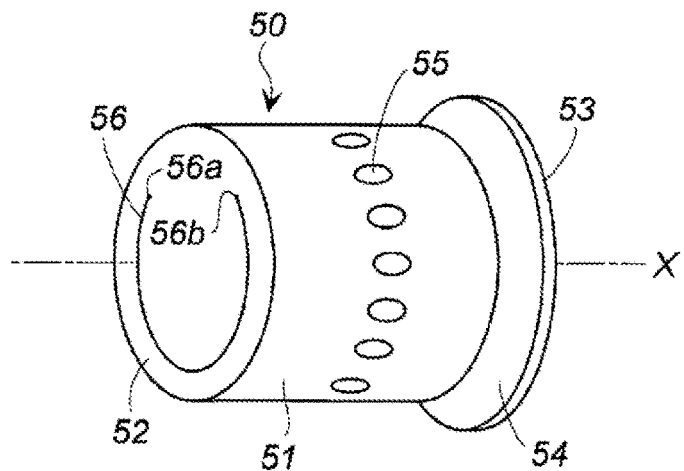
FIG. 4 is a perspective view of a cup-shaped deflector that can be used in the gas generator in FIG. 1.

The cup-shaped deflector 50 illustrated in FIG. 4 includes a plurality of gas passages 55 in the peripheral surface section 51 at regular intervals in the circumferential direction, and a fragile section 56 on the bottom surface section 52. The fragile section 56 is constituted by a groove having a V-shaped cross section in the width direction. Let L represent the shortest distance of a straight line connecting a starting point 56a and an ending point 56b. The fragile section 56 is formed along such a line (arc line) connecting the starting point 56a and the ending point 56b as not to have the shortest distance (L). In the embodiment in FIG. 4, the distance of the arc line (fragile section) connecting the starting point 56a and the ending point 56b is approximately 5 L. The fragile section is not formed between the starting point 56a and the ending point 56b (shortest distance L).

Figure 3:
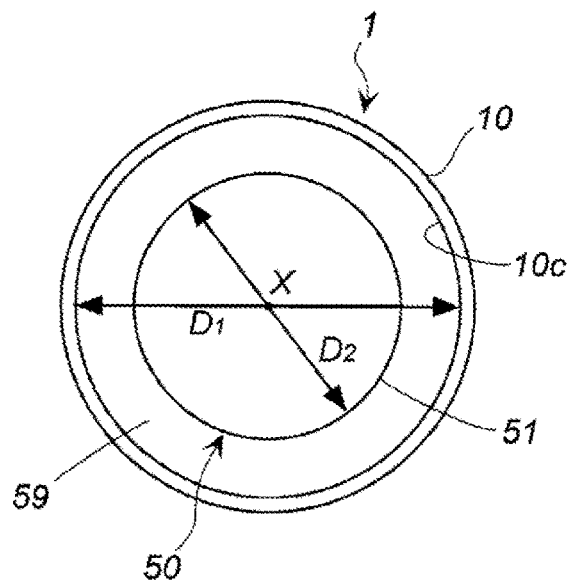
FIG. 3 is a cross-sectional view of the gas generator of the present invention in the radial direction for describing a positional relationship between a cylindrical housing and a cup-shaped deflector.

As illustrated in FIG. 3, the outer diameter (D2) of the cup-shaped deflector 50 is smaller than the inner diameter (D1) of the cylindrical housing 10, and a ratio D2/D1 is preferably 0.5 to 0.8. Thus, a cylindrical gap 59 having a width calculated from (D1−D2)/2 is defined between the outer peripheral surface of the peripheral surface section 51 of the cup-shaped deflector 50 and an inner peripheral wall surface 10c of the cylindrical housing 10. The gas passages 55 face the cylindrical gap 59.

As illustrated in FIG. 1, the cup-shaped deflector 50 is fixed to the inside of the cylindrical housing 10 with the flange 54 in contact with the second annular surface 25 and the inner peripheral wall surface 10c of the cylindrical housing 10.

Figure 2:
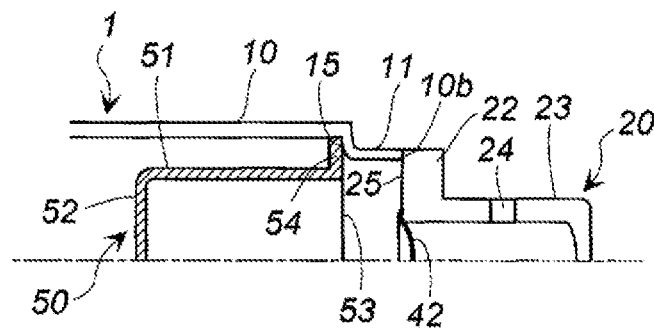
FIG. 2 is a partial cross-sectional view of another embodiment of the gas generator in FIG. 1.

As illustrated in FIG. 2, a third annular surface 15 may be formed by forming a reduced diameter section 11 on the second end 10b side of the cylindrical housing 10, and the cup-shaped deflector 50 may be fixed to the inside of the cylindrical housing 10 with the flange 54 in contact with the third annular surface 15 and the inner peripheral wall surface 10c of the cylindrical housing 10. Note that in the embodiment illustrated in FIG. 2, the annular stepped surface 22a is not required.

The gas generator 1 illustrated in FIG. 1 can also be applied to an embodiment in which only a gas generating agent is used as the gas source. In an embodiment in which only a gas generating agent is used as the gas source, the first rupturable plate 41 in FIG. 1 is not used, and the ignition device chamber 30 and the compressed gas containing chamber 40 constitute a combustion chamber. Thus, the ignition device chamber 30 and the cylindrical housing 10 can be formed by a single member. Furthermore, instead of the second rupturable plate 42, a sealing member (for example, an adhesive tape made from aluminum) is used to close off the combustion chamber and the diffuser 20 come one another to prevent moisture.

The total opening area (A1) of the gas discharge ports 24, the total opening area (A2) of the gas passages 55, and the opening area (A3) of the ruptured fragile section 56 satisfy the relationships A1<A2 and A1<A3. That is, the gas discharge ports 24 are for adjusting the amount of gas discharged, and if gas is blocked upstream from the gas discharge ports 24, A2 and A3 do not affect the amount of gas discharged from the gas discharge ports 24.

Operations of an air bag device using the gas generator 1 will be described with reference to FIG. 1, FIG. 4, FIG. 5A, and FIG. 5B.

Figures 5A, 5B:
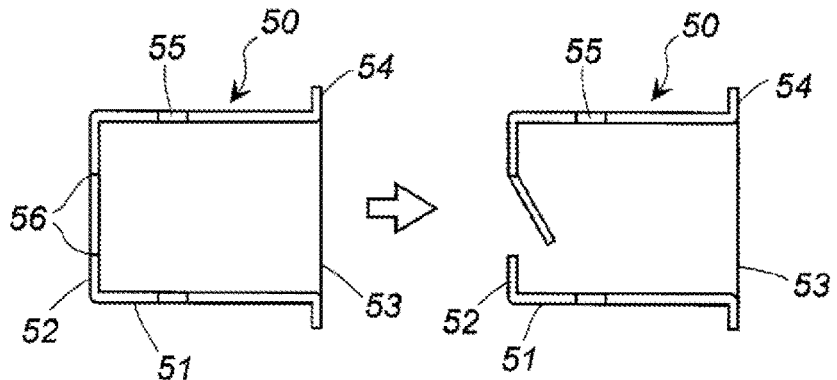
FIGS. 5A and 5B are perspective views illustrating a change in the cup-shaped deflector illustrated in FIG. 4 in the gas generator illustrated in FIG. 1.

Before the igniter 32 is activated, the fragile section 56 on the bottom surface section 52 of the cup-shaped deflector 50 is closed as illustrated in FIG. 4 and FIG. 5A.

When the igniter 32 is activated, combustion products (such as flame and high-temperature gas) are generated and ignite and combust the gas generating agent 36 in the ignition device chamber 30, thus generating high-temperature combustion gas. An increase in pressure due to the high-temperature combustion gas generated causes the first rupturable plate 41 to rupture. This opens the gas discharge path between the ignition device chamber 30 and the compressed gas containing chamber 40, thus allowing the high-temperature combustion gas to flow into the compressed gas containing chamber 40. The high-temperature combustion gas flowing into the compressed gas containing chamber 40 also flows through the gas passages 55 into the inner space of the cup-shaped deflector 50. The inflow of the high-temperature combustion gas increases pressure in the compressed gas containing chamber 40, causing the second rupturable plate 42 to rupture. This opens the gas discharge path between the compressed gas containing chamber 40 and the diffuser 20, thus allowing the gas mixture of the compressed gas and the combustion gas to be discharged from the gas discharge ports 24 to inflate the air bag.

Furthermore, as illustrated in FIG. 5A and FIG. 5B, if the rupture of the first rupturable plate 41 generates a fragment, the fragment collides with the fragile section 56, and the fragile section 56 also ruptures and opens.

The fragment remains in and is caught by the cylindrical gap 59. However, if a large number of the fragments are generated, or if the maximum length of the fragment is greater than the width of the cylindrical gap 59, the fragment entering or caught by the cylindrical gap 59 may partially block the gas passages 55 of the cup-shaped deflector 50. If the gas passages 55 are partially blocked in this way, the flowing gas is not smoothly discharged. This may affect air bag inflation time, and may excessively increase internal pressure, resulting in damage to the cylindrical housing 10. However, in the gas generator 1 in FIG. 1, the collision of the fragment causes the fragile section 56 to rupture, so that the gas discharge path from the compressed gas containing chamber 40 through the opening in the bottom surface section 52 of the cup-shaped deflector 50 to the diffuser 20 is also opened. Thus, the gas generator 1 is not affected by the partially blocked gas passages 55 and can operate normally.

Note that the speed of gas flowing out from the gas generator 1 is controlled by the gas discharge ports 24 and is not thus affected by the opened fragile section 56 even if the gas passages 55 are partially blocked.

Next, the case of using a cup-shaped deflector 50A illustrated in FIGS. 6A and 6B will be described.

Figures 6A, 6B:
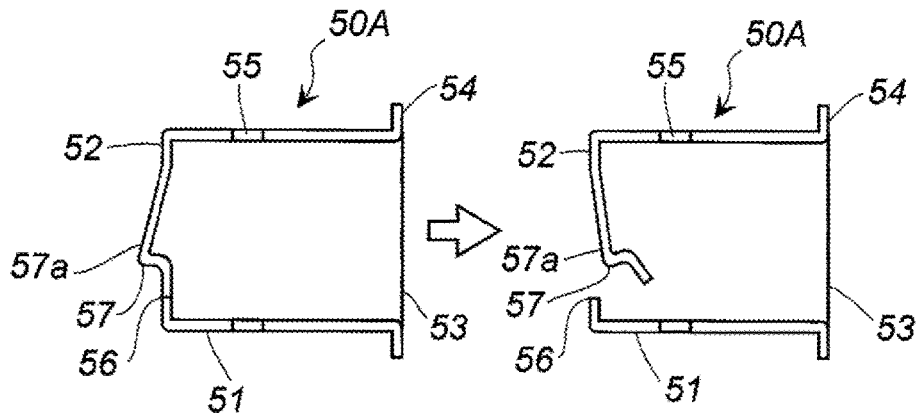
FIGS. 6A and 6B are perspective views illustrating a change in a cup-shaped deflector of a different embodiment from the cup-shaped deflector illustrated in FIG. 4 in the gas generator illustrated in FIG. 1.

With a fragile section 56 illustrated in FIG. 6A, a surface including a portion passing through the starting point 56a and the ending point 56b illustrated in FIG. 4 protrudes outward (protrusion 57), and a surface including a portion surrounded by the fragile section 56 is constituted by an inclining surface 57a. Thus, the portion surrounded by the fragile section 56 has a greater area than that of the embodiment in FIG. 5A, and an area for receiving pressure (gas pressure and pressure due to collision of a fragment) is thus greater. This configuration allows the fragile section 56 in FIG. 6A to rupture more readily than the fragile section 56 of the embodiment illustrated in FIG. 5A. Note that in the embodiment illustrated in FIG. 6A, the entire bottom surface section 52 may be constituted by an inclining surface, and the same fragile section 56 as that in FIG. 4 and FIG. 5A may be formed.

Next, the case of using a cup-shaped deflector 50B illustrated in FIGS. 7A and 7B will be described.

Figures 7A, 7B:
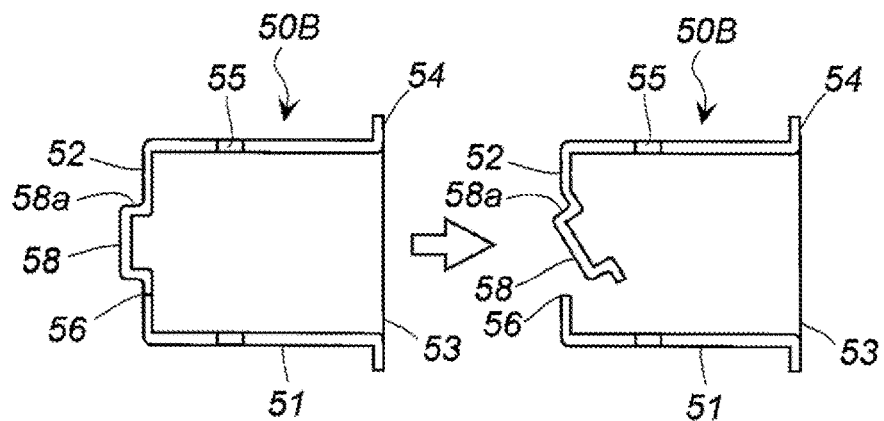
FIGS. 7A and 7B are perspective views illustrating a change in a cup-shaped deflector of a different embodiment from the cup-shaped deflectors illustrated in FIG. 4 and FIGS. 6A and 6B in the gas generator in FIG. 1.

With a fragile section 56 illustrated in FIG. 7A, a platform-like protrusion 58 surrounded by an annular wall surface 58a is provided in a region surrounded by the fragile section 56. The annular wall surface 58a is perpendicular to the bottom surface section 52. If the platform-like protrusion 58 receives pressure due to collision of a fragment, the annular wall surface 58a presses the bottom surface section 52. Thus, the fragile section 56 in FIG. 7A ruptures more readily than the fragile section 56 of the embodiment illustrated in FIG. 5A.

(2) Gas Generator in FIG. 1 and FIGS. 8A to 10B

Figure 8A:
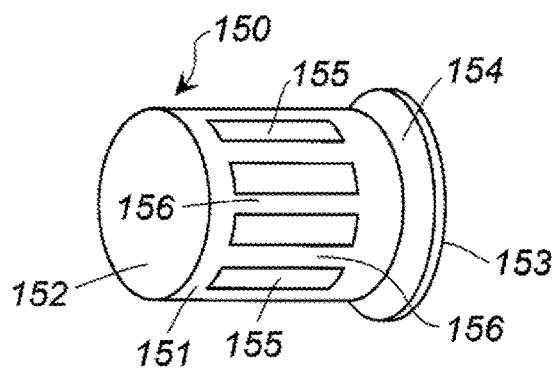
FIGS. 8A and 8B are perspective views illustrating a change in a cup-shaped deflector illustrated in FIG. 8A in the gas generator illustrated in FIG. 1.

The gas generator 1 illustrated in FIG. 1 can use a cup-shaped deflector 150 illustrated in FIG. 8A instead of the cup-shaped deflector 50.

The cup-shaped deflector 150 includes a peripheral surface section 151, a bottom surface section 152, and a flange 154 formed around an opening 153. The cup-shaped deflector 150 includes gas passages 155 formed in the peripheral surface section 151 and shaped into rectangles extending from the bottom surface section 152 toward the opening 153. The rectangular gas passages 155 are formed at regular intervals in the circumferential direction. Peripheral surface section 151 remaining between the rectangular gas passages 155 serve as a plurality of fragile sections 156.

The width (W1) of the rectangular gas passages 155 and the width (W2) of the fragile sections 156 satisfy the relationship W1>W2 to make the fragile sections 156 readily deformable. A ratio W2/W1 is preferably from 0.1 to 0.5.

Figure 9:
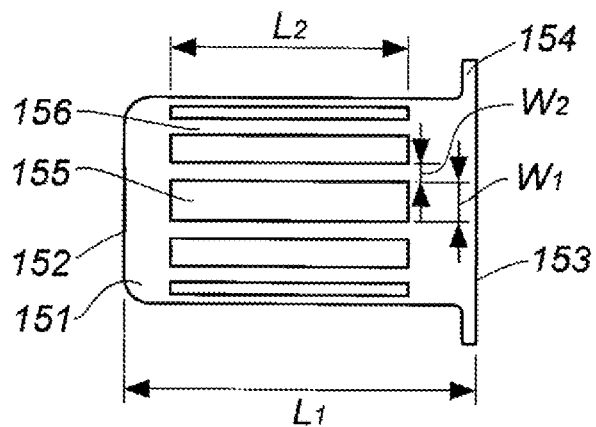
FIG. 9 is a front view for describing a structure of the cup-shaped deflector illustrated in FIG. 8A.

As illustrated in FIG. 9, a ratio (L2/L1) of the length L2 of the gas passages 155 to the length L1 from the opening 153 to the bottom surface section 152 of the cup-shaped deflector 150 is from 0.5 to 0.9 to make the fragile sections 156 readily deformable.

Note that in FIG. 9, the boundary between the peripheral walls 151 and the bottom surface section 152 of the cup-shaped deflector 150 is rounded; however, the boundary may not be rounded as illustrated in FIG. 8A.

Figure 10A:
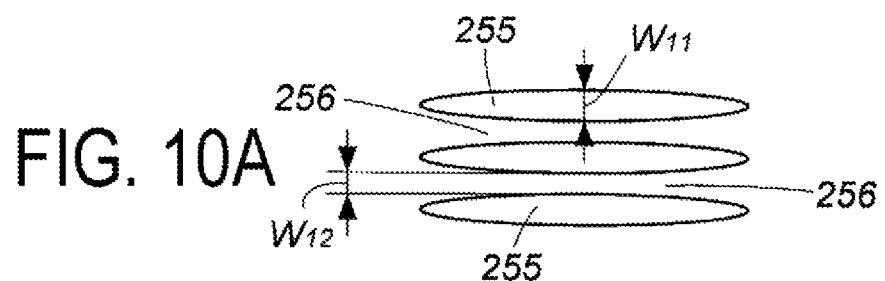
FIG. 10A and FIG. 10B are partial front views each illustrating an embodiment including gas passages and fragile sections having different shapes from those in the cup-shaped deflector in FIG. 8A.

In an embodiment in FIG. 10A, oval gas passages 255 are formed instead of the rectangular gas passages 155 of the embodiment in FIG. 8A and FIG. 9. The oval gas passages 255 each have the maximum short-axis length (W11) at the longitudinally intermediate position, so that fragile sections 256 constituted by peripheral walls 251 interposed between adjacent oval gas passages 255 each have the minimum width (W12) at its longitudinally intermediate portion. The maximum length (W11) and the minimum width (W12) satisfy the relationship W12/W11≤0.5. Thus, the fragile sections 256 of the embodiment in FIG. 10A deform more readily than the fragile sections 156 of the embodiment in FIG. 8A and FIG. 9.

Figure 10B:
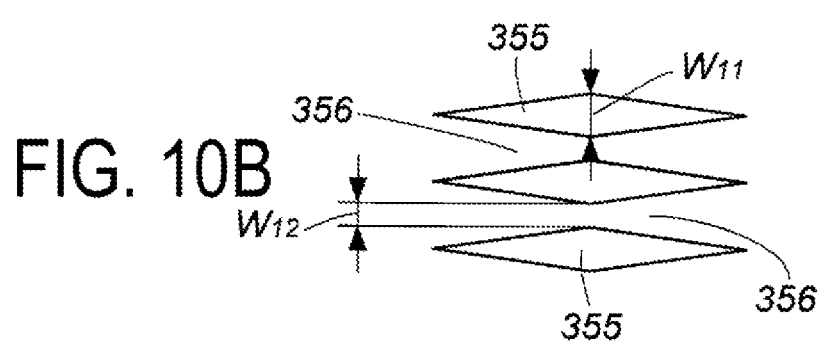

In an embodiment in FIG. 10B, diamond-shaped gas passages 355 are formed instead of the rectangular gas passages 155 of the embodiment in FIG. 8A and FIG. 9. The diamond-shaped gas passages 355 each have the maximum short-axis length (W11) at the longitudinally intermediate position, so that fragile sections 356 constituted by peripheral walls 351 interposed between adjacent diamond-shaped gas passages 355 each have the minimum width (W12) at its longitudinally intermediate portion. The maximum length (W11) and the minimum width (W12) satisfy the relationship W12/W11≤0.5. Thus, the fragile sections 356 of the embodiment in FIG. 10B deform more readily than the fragile sections 156 of the embodiment in FIG. 8A and FIG. 9.

Operations of an air bag device using the cup-shaped deflector 150 illustrated in FIG. 8A, instead of the cup-shaped deflector 50 illustrated in FIG. 4, in the gas generator 1 illustrated in FIG. 1 will be described.

Before the igniter 32 is activated, the cup-shaped deflector 150 is in the state illustrated in FIG. 8A.

Figure 8B:
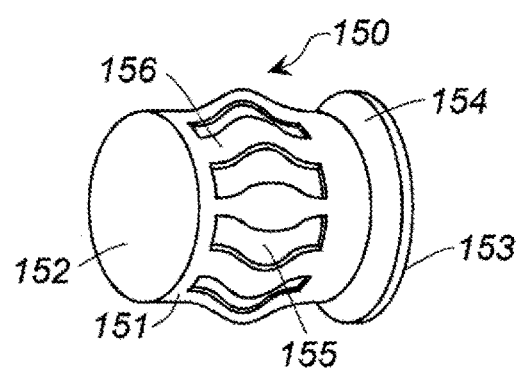

In processes similar to the above-described processes of the gas generator 1 in FIG. 1 and FIG. 4, if the first rupturable plate 41 ruptures and generates a fragment, the fragment remains in and is caught by the cylindrical gap 59. However, if a large number of the fragments are generated, or if the maximum length of the fragment is greater than the width of the cylindrical gap 59, the fragment entering or caught by the cylindrical gap 59 may partially block the gas passages 155 of the cup-shaped deflector 150. However, the gas generator 1 in FIG. 1 (FIG. 8A) includes the fragile sections 156 formed at regular intervals in the circumferential direction, so that the bottom surface section 152 receives pressure due to collision of the fragment, and as illustrated in FIG. 8A and FIG. 8B, the cup-shaped deflector 150 deforms in a compressed manner. In this way, when the cup-shaped deflector 150 deforms in a compressed manner, the rectangular gas passages 155 deform so as to expand radially outward, resulting in an increase in an opening area. In addition, when the rectangular gas passages 155 deforms so as to expand radially outward, the fragment blocking the rectangular gas passages 155 is thrown into the cylindrical gap 59.

Note that the speed of gas flowing out from the gas generator 1 is controlled by the gas discharge ports 24 and is not thus affected by the partially blocked gas passages 155 and the opened fragile section 156.

The present invention has been described above. The present invention of course includes various modifications within its scope, and these modifications should not be construed to depart from the scope of the present invention. In addition, all apparently considered as modifications of the present invention by those having common knowledge in the art are within the scope of the appended claims.

The invention claimed is:

1. A gas generator, comprising:
   an ignition device chamber arranged on a first end side of a cylindrical housing and closed by an ignition device provided with an igniter;
   a diffuser including a gas discharge port and closing a second end side of the cylindrical housing opposite to the first end side in an axial direction;
   a compressed gas containing chamber disposed between the diffuser and the ignition device chamber and containing therein a compressed gas as a gas source;

a first rupturable plate disposed closing off the ignition device chamber and the compressed gas containing chamber from one another, and a second rupturable plate disposed closing off the compressed gas containing chamber and the diffuser from one another; and
a cup-shaped deflector disposed on a side of the second rupturable plate and downstream of a gas flow with respect to the ignition device chamber, the first rupturable plate, and the compressed gas containing chamber; wherein
the cup-shaped deflector includes a gas passage in a peripheral surface section thereof, and a fragile section on at least one of a bottom surface section thereof and the peripheral surface section; and
the cup-shaped deflector is disposed with the bottom surface section located on a side where the first rupturable plate is disposed, the cup-shaped deflector has an opening covering the second rupturable plate, and defines a cylindrical gap between the peripheral surface section and an inner peripheral wall surface of the cylindrical housing.

2. The gas generator according to claim 1, wherein
the cup-shaped deflector includes the gas passage in the peripheral surface section and the fragile section on the bottom surface section; and
the fragile section is constituted by a groove formed along a line connecting a starting point and an ending point located remote from each other so as not have a shortest distance (L), the groove having a total distance of from 2 L to 15 L.

3. The gas generator according to claim 1, wherein
the cup-shaped deflector includes the gas passage and the fragile section in the peripheral surface section;
the gas passage is constituted by a plurality of elongated holes formed in a section between the bottom surface section and the opening, the plurality of elongated holes being formed at intervals in a circumferential direction; and
the fragile section is constituted by a plurality of peripheral walls remaining between the plurality of elongated holes in the circumferential direction.

4. The gas generator according to claim 3, wherein
the cup-shaped deflector includes the gas passage and the fragile section in the peripheral surface section; and
a ratio (L2/L1) of a length L2 of the gas passage to a length L1 from the opening to the bottom surface section of the cup-shaped deflector is from 0.5 to 0.9.

5. The gas generator according to claim 3, wherein
a ratio D2/D1 of an outer diameter D2 of the cup-shaped deflector to an inner diameter D1 of the cylindrical housing is from 0.5 to 0.8; and
the cylindrical gap defined between the peripheral surface section of the cup-shaped deflector and the inner peripheral wall surface of the cylindrical housing has a width defined as (D1−D2)/2.

6. The gas generator according to claim 1, wherein
the cup-shaped deflector includes the gas passage and the fragile section in the peripheral surface section;
the gas passage is constituted by a plurality of rectangular holes formed in a section between the bottom surface section and the opening, the plurality of rectangular holes being formed at intervals in a circumferential direction and each of the plurality of rectangular holes having a width W1;
the fragile section is constituted by a plurality of peripheral walls remaining between the plurality of rectangular holes in the circumferential direction, each of the plurality of peripheral walls having a width W2; and
the width W1 of the plurality of rectangular holes and the width W2 of the plurality of peripheral walls constituting the fragile section satisfy a relationship W1>W2.

7. The gas generator according to claim 6, wherein
the cup-shaped deflector includes the gas passage and the fragile section in the peripheral surface section; and
a ratio (L2/L1) of a length L2 of the gas passage to a length L1 from the opening to the bottom surface section of the cup-shaped deflector is from 0.5 to 0.9.

8. The gas generator according to claim 1, wherein
the cup-shaped deflector includes the gas passage and the fragile section in the peripheral surface section;
the gas passage is constituted by a plurality of elongated holes formed in a section between the bottom surface section and the opening, the plurality of elongated holes being formed at intervals in a circumferential direction and each of the plurality of elongated holes having a maximum width (short-axis length) W11 at a longitudinally intermediate portion;
the fragile section is constituted by a plurality of peripheral walls remaining between the plurality of elongated holes in the circumferential direction, each of the plurality of peripheral walls having a minimum width W12 at the longitudinally intermediate portion of the plurality of elongated holes; and
a relationship W12/W11<0.5 is satisfied.

9. The gas generator according to claim 6, wherein
a ratio D2/D1 of an outer diameter D2 of the cup-shaped deflector to an inner diameter D1 of the cylindrical housing is from 0.5 to 0.8; and
the cylindrical gap defined between the peripheral surface section of the cup-shaped deflector and the inner peripheral wall surface of the cylindrical housing has a width defined as (D1−D2)/2.

10. A gas generator, comprising:
a cylindrical housing closed at a first end side by an ignition device provided with an igniter,
a diffuser including a gas discharge port and closing a second end side of the cylindrical housing opposite to the first end side in an axial direction;
a combustion chamber disposed between the diffuser and the ignition device and containing therein a gas generating agent as a gas source;
a sealing member disposed closing off the combustion chamber and the diffuser from one another; and
a cup-shaped deflector disposed on a side of the sealing member and downstream of a gas flow with respect to the combustion chamber; wherein
the cup-shaped deflector includes a gas passage in a peripheral surface section thereof, and a fragile section on at least one of a bottom surface section thereof and the peripheral surface section; and
the cup-shaped deflector is disposed with the bottom surface section located on the first end side, the cup-shaped deflector has an opening covering the sealing member, and defines a cylindrical gap between the peripheral surface section and an inner peripheral wall surface of the cylindrical housing.

11. The gas generator according to claim 10, wherein
the cup-shaped deflector includes the gas passage in the peripheral surface section and the fragile section on the bottom surface section; and
the fragile section is constituted by a groove formed along a line connecting a starting point and an ending point located remote from each other so as not have a shortest distance (L), the groove having a total distance of from 2 L to 15 L.

12. The gas generator according to claim 10, wherein
the cup-shaped deflector includes the gas passage and the fragile section in the peripheral surface section;
the gas passage is constituted by a plurality of elongated holes formed in a section between the bottom surface section and the opening, the plurality of elongated holes being formed at intervals in a circumferential direction; and
the fragile section is constituted by a plurality of peripheral walls remaining between the plurality of elongated holes in the circumferential direction.

13. The gas generator according to claim 12, wherein
the cup-shaped deflector includes the gas passage and the fragile section in the peripheral surface section; and
a ratio (L2/L1) of a length L2 of the gas passage to a length L1 from the opening to the bottom surface section of the cup-shaped deflector is from 0.5 to 0.9.

14. The gas generator according to claim 12, wherein
a ratio D2/D1 of an outer diameter D2 of the cup-shaped deflector to an inner diameter D1 of the cylindrical housing is from 0.5 to 0.8; and
the cylindrical gap defined between the peripheral surface section of the cup-shaped deflector and the inner peripheral wall surface of the cylindrical housing has a width defined as (D1−D2)/2.

15. The gas generator according to claim 10, wherein
the cup-shaped deflector includes the gas passage and the fragile section in the peripheral surface section;
the gas passage is constituted by a plurality of rectangular holes formed in a section between the bottom surface section and the opening, the plurality of rectangular holes being formed at intervals in a circumferential direction and each of the plurality of rectangular holes having a width W1;
the fragile section is constituted by a plurality of peripheral walls remaining between the plurality of rectangular holes in the circumferential direction, each of the plurality of peripheral walls having a width W2; and
the width W1 of the plurality of rectangular holes and the width W2 of the plurality of peripheral walls constituting the fragile section satisfy a relationship W1>W2.

16. The gas generator according to claim 15, wherein
the cup-shaped deflector includes the gas passage and the fragile section in the peripheral surface section; and
a ratio (L2/L1) of a length L2 of the gas passage to a length L1 from the opening to the bottom surface section of the cup-shaped deflector is from 0.5 to 0.9.

17. The gas generator according to claim 15, wherein
a ratio D2/D1 of an outer diameter D2 of the cup-shaped deflector to an inner diameter D1 of the cylindrical housing is from 0.5 to 0.8; and
the cylindrical gap defined between the peripheral surface section of the cup-shaped deflector and the inner peripheral wall surface of the cylindrical housing has a width defined as (D1−D2)/2.

18. The gas generator according to claim 10, wherein
the cup-shaped deflector includes the gas passage and the fragile section in the peripheral surface section;
the gas passage is constituted by a plurality of elongated holes formed in a section between the bottom surface section and the opening, the plurality of elongated holes being formed at intervals in a circumferential direction and each of the plurality of elongated holes having a maximum width (short-axis length) W11 at a longitudinally intermediate portion;
the fragile section is constituted by a plurality of peripheral walls remaining between the plurality of elongated holes in the circumferential direction, each of the plurality of peripheral walls having a minimum width W12 at the longitudinally intermediate portion of the plurality of elongated holes; and
a relationship W12/W11<0.5 is satisfied.

19. The gas generator according to claim 18, wherein
the cup-shaped deflector includes the gas passage and the fragile section in the peripheral surface section; and
a ratio (L2/L1) of a length L2 of the gas passage to a length L1 from the opening to the bottom surface section of the cup-shaped deflector is from 0.5 to 0.9.

20. A gas generator, comprising:
an ignition device chamber arranged on a first end side of a cylindrical housing and closed by an ignition device provided with an igniter;
a diffuser including a gas discharge port and closing a second end side of the cylindrical housing opposite to the first end side in an axial direction;
a combustion chamber disposed between the diffuser and the ignition device and containing therein a gas generating agent as a gas source;
a sealing member disposed closing off the combustion chamber and the diffuser from one another; and
a cup-shaped deflector disposed on a side of the sealing member and downstream of a gas flow with respect to the ignition device chamber and the combustion chamber; wherein
the cup-shaped deflector includes a gas passage in a peripheral surface section thereof, and a fragile section on at least one of a bottom surface section thereof and the peripheral surface section; and
the cup-shaped deflector is disposed with the bottom surface section located on the first end side, the cup-shaped deflector has an opening covering the sealing member, and defines a cylindrical gap between the peripheral surface section and an inner peripheral wall surface of the cylindrical housing.

* * * * *